(12) United States Patent  
Riglet-Martial

(10) Patent No.: US 8,093,175 B2
(45) Date of Patent: Jan. 10, 2012

(54) MINERAL COMPOSITION CAPABLE OF TRAPPING HYDROGEN, PREPARATION METHOD AND USES

(75) Inventor: Chantal Riglet-Martial, Le Tholonet (FR)

(73) Assignee: Commissariat a l'Energie Atomique, Paris (FR)

( * ) Notice: Subject to any disclaimer, the term of this patent is extended or adjusted under 35 U.S.C. 154(b) by 37 days.

(21) Appl. No.: 12/518,116

(22) PCT Filed: Dec. 11, 2007

(86) PCT No.: PCT/EP2007/063739
§ 371 (c)(1),
(2), (4) Date: Dec. 15, 2009

(87) PCT Pub. No.: WO2008/071716
PCT Pub. Date: Jun. 19, 2008

(65) Prior Publication Data
US 2010/0105550 A1 Apr. 29, 2010

(30) Foreign Application Priority Data
Dec. 12, 2006 (FR) .................... 06 55437

(51) Int. Cl.
B01J 27/057 (2006.01)
B01J 27/25 (2006.01)
B01J 27/02 (2006.01)
B01J 23/00 (2006.01)
B01J 23/40 (2006.01)
B01J 23/42 (2006.01)
C01B 19/00 (2006.01)
C01B 25/14 (2006.01)
C01B 19/04 (2006.01)
C01B 17/00 (2006.01)
C01B 17/32 (2006.01)
C01B 17/42 (2006.01)
H01M 4/58 (2010.01)
C01B 3/02 (2006.01)
B01D 53/22 (2006.01)
B01D 53/56 (2006.01)
C01D 3/00 (2006.01)
C08L 95/00 (2006.01)
C09D 4/00 (2006.01)
C09D 101/00 (2006.01)
C09D 201/00 (2006.01)
B65D 85/00 (2006.01)
B65D 3/00 (2006.01)

(52) U.S. Cl. ........ 502/215; 502/201; 502/216; 502/300; 502/305; 502/315; 502/325; 502/337; 423/508; 423/509; 423/511; 423/560; 423/561.1; 423/648.1; 423/248; 423/658.2; 106/273.1; 106/284.3; 206/0.7; 252/181.6; 252/184; 252/182.32; 252/182.33; 252/181.7

(58) Field of Classification Search .................. 502/201, 502/215, 216, 300, 305, 315, 325, 337; 423/508, 423/509, 511, 560, 561.1, 648.1, 248, 658.2; 588/5, 15, 249, 251, 901; 106/273.1, 284.3; 206/0.7; 252/181.6, 184, 182.32, 182.33, 252/181.7
See application file for complete search history.

(56) References Cited

U.S. PATENT DOCUMENTS

| 3,412,103 | A | 11/1968 | Chibnik et al. |
| 4,351,735 | A * | 9/1982 | Buddemeyer et al. ............ 252/1 |
| 5,888,665 | A | 3/1999 | Bugga et al. |
| 6,645,396 | B2 | 11/2003 | Montanari et al. |
| 7,329,399 | B2 | 2/2008 | Camaro et al. |

FOREIGN PATENT DOCUMENTS

| FR | 2 859 202 A1 | 3/2005 |
| WO | WO 97/26082 | 7/1997 |
| WO | WO 01/68516 A1 | 9/2001 |

OTHER PUBLICATIONS

"Trapping of radiolytic hydrogen by amorphous cobalt oxysulfide," C. Loussot et al. Journal of Nuclear Materials 359 (2006), pp. 238-246.*
Winkler et al., "Internal State Distribution of Molecular Hydrogen Isotopes Desorbing from Clean and Modified Ni (110) Surfaces" dated Aug. 26, 1994, Chemical Physics Letters Netherlands, vol. 226, No. 5-6, pp. 589-594, XP-002446750.

Yamada et al. "Catalytic Isotope Scrambling of $H_2 + D_2$ and the Formation of Surface Compounds Involving Oxygen on Ni(100) Modified by Sulfur," Surface Science Netherlands, vol. 207, No. 2-3, Jan. 1989, pp. 323-343, XP-002446751.

\* cited by examiner

*Primary Examiner* — Patricia L Hailey

(74) *Attorney, Agent, or Firm* — Miles & Stockbridge P.C.

(57) ABSTRACT

The invention relates to a composition capable of trapping hydrogen comprising:

(a) at least one mineral compound of formula (I) below:

MX(OH)               (I)

in which:
    M represents a divalent transition element;
    O represents an oxygen atom;
    X represents an atom chosen from S, Se, Te, Po; and
    H represents a hydrogen atom; and
(b) at least one nitrate salt of formula (II) below:

$ZNO_3$               (II)

in which Z is a monovalent cation.

Use of these compositions either in pulverulent form for trapping gaseous hydrogen by direct interaction, or in the form of an adjuvant in a containment material for, for example, trapping hydrogen released by radiolysis in radioactive waste packages.

24 Claims, 1 Drawing Sheet

MINERAL COMPOSITION CAPABLE OF TRAPPING HYDROGEN, PREPARATION METHOD AND USES

TECHNICAL FIELD

The present invention relates to a composition capable of irreversibly trapping dihydrogen and to a method of preparing this composition.

The present invention also relates to organic materials comprising such a composition.

The present invention relates to applications in all situations, for example in industry or in the laboratory, in which gaseous hydrogen or tritium is generated, given off or discharged, with the objective for example of limiting the amount thereof that is discharged, especially for pollution or contamination reasons, or to control the contents thereof in confined environments, especially for safety reasons.

One important application relates to the incorporation of the composition of the invention into a material, for example for the encapsulation of waste, for example a bitumen, within which hydrogen can form, especially by radiolysis. The instantaneous trapping of the hydrogen generated in situ allows the material to retain its integrity, that is to say it does not deform nor crack, which considerably increases its mechanical withstand capability as regards gas production, and therefore its durability.

PRIOR ART

Hydrogen is a potentially dangerous gas that can ignite or explode in the presence of air. In industrial plants, the hydrogen risk may be prevented, for example, by suitable ventilation of the plant, or else by chemical elimination of the hydrogen, this elimination possibly being carried out by controlled combustion of said hydrogen, or else by catalytically trapping it in an oxygen-containing environment or by chemically trapping it in an oxygen-depleted environment.

It is specified that, in the aforegoing and in what follows, the term "hydrogen" is understood to mean gaseous hydrogen $H_2$ and the isotopic forms of the latter, that is to say the deuterated forms, such as HD and $D_2$, the tritiated forms, such as HT and $T_2$ and the mixed forms (that is to say both deuterated and tritiated) such as DT.

It is specified that D corresponds to deuterium $_1{}^2H$ and that T corresponds to tritium $_1{}^3H$.

In the case of an oxygen-lean, confined environment, the most commonly used hydrogen-trapping chemical compounds are organic compounds, such as those described in WO-A-01/68516 or U.S. Pat. No. 6,645,396, metal hydrides, such as those described in U.S. Pat. No. 5,888,665, or metal oxides. Depending on the application envisaged, these compounds may have a certain number of drawbacks associated, for example, with the potential reversibility of the trapping, with their long-term instability (problems of chemical decomposition, radiolytic decomposition, etc.) and with the operating conditions (temperature, catalyst, etc.).

Moreover, research on the reactivity of hydrogen with respect to solid materials has been intensified in recent years, especially in the field of the development of fuel cells, as regards compounds that allow reversible containment of hydrogen. Within this context, the most promising materials at the present time are solid compounds of the hydride type, for example palladium hydride, titanium-iron hydride, magnesium-nickel hydride, zirconium-manganese hydride, lanthanum-nickel hydride, etc., the adsorptivities of which, expressed as mass of trapped $H_2$ per mass of metal usually have values from 1 to 2%, or carbon tube structures of nanoscale size (called nanotubes) such as those described in document WO-A-97/26082, which can have very high adsorptivities.

Safety and compactness are the significant advantages of these methods of containment. The major drawbacks lie in their cost, their effectiveness, their feasibility and their availability.

It should be noted that the advantages and disadvantages of the various known trapping compounds are intimately associated with their applications. Thus, for example, the main objective of materials developed for fuel cells is $H_2$ trapping/storage reversibility, whereas this property is completely unacceptable for applications such as the trapping of $H_2$ generated by radiolysis in the bitumen encapsulation of radioactive waste.

In the nuclear industry, low-level and medium-level radioactive waste is encapsulated in solid matrices, such as bitumen for example. Among the encapsulation materials used, bitumen has many advantages in terms of the containment and encapsulation of the waste. Consisting mostly of aromatic compounds, it counts among the organic matrices that are the least sensitive to irradiation. Thus, its level of radiolytic hydrogen production is quite low, around 0.4 molecules/100 eV. However, owing to its very low transfer properties—a major advantage in fact as regards the intrusion of species and the release of radionuclides in storage or encapsulation scenarios—the bitumen matrix has difficulty in discharging the hydrogen generated in situ by radiolysis, which may result in a loss of integrity of the material (swelling, cracking) if the activity incorporated into the material exceeds the threshold corresponding to the maximum capacity for discharge by diffusion.

The drawbacks associated with the swelling, by internal radiolysis, of the bitumen matrix significantly limit permissible levels that can be incorporated per waste package, hence an increase in the number of packages produced, which is financially disadvantageous.

The incorporation of a hydrogen-trapping compound in bitumen-encapsulated radioactive waste packages would make it possible, on the one hand, to significantly reduce their swellability in storage situations and, on the other hand, to substantially increase equivalent activity levels incorporated per waste package, while still guaranteeing good mechanical integrity of the material with regard to gas production. However, compounds of the organic type, hydrides or nanotubes, are ill-suited in this context, owing to the abovementioned drawbacks of these materials, to which has to be added the potential reversibility of the trapping and the risk of incompatibility, especially chemical incompatibility, within the radioactive-waste packages. The potential reversibility of the trapping is a major drawback of certain known $H_2$-trapping compounds for the radiolytic $H_2$ trapping application in bitumen-encapsulated packages.

It is therefore in particular to overcome this problem of the swelling of the waste packages that the trapping compound of MXOH type was used in the process of encapsulating low-level and medium-level radioactive waste in a bitumen matrix. The formulation of this compound, and more particularly CoSOH (M=Co=cobalt; X=S=sulphur), the manufacturing process thereof and the uses of same were the subject of patent FR 2859202. This compound has several major advantages for the application relating to encapsulations of low-level and medium-level radioactive waste in a bitumen matrix since it fully meets the criteria of irreversibility and quantitativity of the trapping, compactness and good trapping capacity, simple manufacture and easy handling, stability with respect to possible external (chemical or radiolytic) attacks, wide range of uses, and low cost.

The CoSOH compound has a trapping capacity of 0.5 mol of $H_2$/mol of Co, i.e. 190 l of $H_2$ (STP)/kg of Co (STP: Standard Temperature and Pressure, 273 K and $10^5$ Pa), i.e. a trapping capacity, expressed as mass of $H_2$ trapped per mass of Co, of 1.7%, which places it among the most efficient $H_2$-trapping compounds currently known. Nevertheless, for all of the applications associated with mitigating the hydrogen risk and especially for the application to nuclear waste encapsulated in an organic matrix, the objective is to have still more efficient $H_2$-trapping chemical systems while meeting the aforementioned criteria of irreversibility, quantitativity, compactness, stability, etc. One subject of the present invention is specifically to meet the need to have, within the context of preventing the hydrogen risk or of controlling the swelling of radioactive waste packages, high-capacity irreversible hydrogen traps.

The authors set themselves the objective of improving the trapping properties of the MX(OH)-type compounds that are the subject of patent application FR 2859202.

They thus discovered, surprisingly, that by adding one particular compound to the aforementioned MX(OH) compounds, it was possible to significantly improve the trapping capacity of the resulting system.

SUMMARY OF THE INVENTION

Thus, the invention relates, according to a first subject, to a composition capable of trapping hydrogen comprising:
(a) at least one mineral compound of formula (I) below:

$$MX(OH) \qquad (I)$$

in which:
M represents a divalent transition element;
O represents an oxygen atom;
X represents an atom chosen from S, Se, Te, Po; and
H represents a hydrogen atom; and
(b) at least one nitrate salt of formula (II) below:

$$ZNO_3 \qquad (II)$$

in which Z is a monovalent cation.

One of the main advantages of this composition is that it spontaneously and quantitatively traps the gaseous hydrogen from atmospheric pressure ($10^5$ Pa) and to very low pressures ($<10^3$ Pa) at ambient temperature. Furthermore, a significant improvement has been observed in the hydrogen-trapping capacity, relative to the MX(OH) compound alone, this capacity being multiplied by a factor of around 3.5.

M may advantageously be chosen from the group composed of Cr, Mn, Fe, Co, Ni, Cu, Zn. Preferably, M is Co or Ni. More preferably, M is Co.

Preferably, X is S.

Z may advantageously be chosen from the group composed of $Li^+$, $Na^+$ or $K^+$.

Preferably, Z is $Na^+$.

For the compositions of the invention, the $NO_3/M$ molar ratio (that is to say the ratio of the number of moles of $NO_3$ to the number of moles of M) is preferably greater than 0.5. Preferably, $NO_3/M$ is between 0.5 and 2. It was surprisingly observed, under these conditions, that the trapping capacity of the composition was at a maximum and no longer depended on the $NO_3/M$ molar ratio.

For an $NO_3/M$ ratio less than 0.5 and greater than 0, a significant improvement was also observed in the trapping capacity of the composition, relative to the MXOH compound alone, this improvement being dependent on the $NO_3/M$ ratio.

Generally, the compositions of the invention are manufactured by a method comprising:
a step of preparing the compound(s) of formula (I) as defined above;
a step of supplying with compound(s) of formula (II), this step possibly taking place before, at the same time as and/or after the step of preparing the compound(s) of formula (I).

The step of preparing the compound of formula (I) relies on the mixing, in aqueous solution, of a dissolved salt of X (i.e. $X^{2-}$) and of a dissolved salt of M (i.e. $M^{2+}$).

The concentrations of the two reactants in aqueous solution may vary over a wide range, up to their solubility limit, for example from $10^{-1}$M to 1.5M.

The compounds of formula (I) may be synthesized by mixing two aqueous solutions, a first aqueous solution containing the dissolved salt(s) of X and a second aqueous solution containing the dissolved metal salt(s).

The compounds of formula (I) may also be synthesized by simultaneous, or else successive, dissolution of the two reactants, i.e. of at least one metal salt in a single aqueous solution.

The dissolved salt of M (i.e. $M^{2+}$) may be chosen from $MSO_4$, $M(ClO_4)_2$ or $MCl_2$.

The dissolved salt of X (i.e. $X^{2-}$) may be chosen from $Na_2X$, $(NH_4)_2X$, $Li_2X$, $K_2X$ or a mixture of these compounds.

It is very advantageous to carry out the mixing of the dissolved salt of X and of the dissolved salt of M in air for a sufficient time to obtain a stabilization of the $E_H$ and pH parameters, for example, for $E_H$ at a value between −150 and +100 mV relative to the Ag(s)/AgCl(s)/KCl$_{saturated}$ reference electrode and for pH at a value between 8.0 and 9.5. Under these conditions, the yield of the synthesis of the MXOH compound is greater than 99% and the degree of oxidation is less than 1%.

In accordance with the preparation method of the invention, a step of supplying $ZNO_3$ in a predetermined amount is carried out, this supply step possibly taking place:
before the step of preparing the compound of formula (I), that is to say that $ZNO_3$ is first dissolved in an aqueous solution before the introduction of the salts mentioned previously for the preparation of the compound (I);
at the same time as the step of preparing the compound (I);
after the step of preparing the compound (I), that is to say after the formation of the MXOH compound.

At the end of the two aforementioned steps, an aqueous suspension of the composition comprising an MXOH compound and a $ZNO_3$ compound is thus obtained.

In order to obtain a chemical composition capable of trapping hydrogen in a pulverulent form, the aqueous suspension may be dried at a temperature generally between 70° C. and 100° C. under an inert atmosphere.

The dry composition obtained may be ground and optionally screened so as to obtain a uniform particle size. This treatment may be useful, especially when the composition of the present invention is intended to be incorporated into a material, in particular for the sake of integrity of the matrix and uniform hydrogen-trapping within said material.

As regards the $H_2$ trapping, from a theoretical standpoint the more divided the product the higher its specific surface area and the more efficient the product therefore is (the trapping yield approaches the thermodynamic yield). Experimentally, the reactivity of the composition with respect to $H_2$ is such that the particle size of the compound does not constitute a critical parameter. In other words, the product remains efficient whatever its particle size.

In contrast, the particle size of the salts may be important in terms of their incorporation into a solid material, so as to preserve the integrity of the matrix (risk of cracking) and to guarantee good uniformity of the encapsulant. In the case of a bitumen matrix, the typical particle size of the incorporated salts varies, advantageously, between 0.2 and 300 μm, with a maximum in the 20 to 50 μm range.

The compositions of the present invention may be incorporated, or encapsulated, in an organic material, either in dry or wet pulverulent form, preferably with a uniform particle size, for example one of those particle sizes mentioned above, or in the form of a precipitate in suspension, preferably in a non-oxidizing solution.

This incorporation falls within a number of applications of the present invention in which the $H_2$ trapping is carried out actually within a material, for example an organic material, in which the $H_2$ is generated and/or into which it can migrate by internal or external diffusion. The material then forms a matrix into which the composition capable of trapping hydrogen is incorporated. For example, it may be a waste-encapsulation material, such as a bituminous material for nuclear waste or an inert material intended to stabilize the initially pulverulent composition capable of trapping hydrogen in a compact form exhibiting good mechanical integrity and therefore able to be handled more easily.

An organic material able to incorporate the composition of the present invention may for example be the bitumen used for encapsulation of radioactive waste.

The bitumens that can be used in the present invention may be those known to those skilled in the art.

The compositions of the present invention are preferably incorporated into an organic material that is chemically inert with respect to said compositions and in a suitable proportion so as not to degrade the mechanical properties of said material once it has cured.

According to the invention, in the example of a bitumen-based material, the amount of composition that can be incorporated may advantageously be from 1.5% to 82% in total, expressed as mass of composition/mass of bitumen.

Whatever the matrix in question, the maximum amount of salts that can be incorporated, including the composition capable of trapping hydrogen, is the result of a compromise between the level of incorporation, handlability and integrity of the final encapsulant. In the case of a bituminous matrix, the maximum salt content, whatever the salt incorporated, cannot according to these criteria generally exceed 55 wt % (expressed as mass of salt)/encapsulant, i.e. 82 wt %/bitumen. This means that if the composition of the invention is introduced in a quantity of x % relative to the mass of bitumen, then at most the waste is introduced in a quantity of (82−x) % relative to the mass of bitumen.

Consequently, the amount of composition that can be incorporated into a bitumen matrix could advantageously vary between 1.5 wt %/bitumen and 82 wt %/bitumen.

The incorporation into the organic material may be carried out by any process known to those skilled in the art for incorporating a powder or a suspension into a material, especially by mixing, for example mechanical mixing, of the composition of the present invention with the material, optionally made in liquid form beforehand, for example by dissolving or heating it, followed by the curing of the encapsulant material, optionally after evaporation of the solvent and/or cooling.

When the composition of the invention is in the form of a preparation in suspension, the liquid phase may be partially removed by decanting, before incorporation of the composition of the invention into the organic material. The liquid phase may also be evaporated by heating during the incorporation of the composition into the organic material.

The present invention also relates to an organic encapsulation material, said material comprising an organic material for encapsulating waste and the composition capable of trapping hydrogen according to the invention.

The waste, which may be encapsulated by means of such an encapsulating material, may be a radioactive solid waste, for example obtained by the chemical coprecipitation treatment of a radioactive effluent, or else a non-radioactive industrial solid waste such as, for example, a spent catalyst that cannot be recycled, or an activated carbon waste.

The organic encapsulation material may be a bitumen, for example such as those known to those skilled in the art for encapsulating radioactive waste. It may also be any other organic material suitable for encapsulating radioactive waste, or any other organic material suitable for encapsulating non-radioactive waste, depending on the application of the present invention.

In one example of an application, the composition of the present invention may be used for example for trapping radiolytic hydrogen within an organic matrix for the encapsulation of radioactive waste.

Thus, the present invention also relates to a method of encapsulating a solid waste, said method successively comprising the following steps:
encapsulation using an organic encapsulation material, liquefied beforehand by heating the solid waste to be encapsulated, and a composition capable of trapping hydrogen according to the present invention; and
cooling and solidification of the encapsulant obtained in the preceding step.

The encapsulation matrices that can be used, and also the solid waste that can be encapsulated using this method, are described above.

When the solid waste is radioactive, it may be obtained by any method known to those skilled in the art for extracting a solid radioactive waste from an effluent.

For example, when the effluent is a liquid, it may be advantageous to carry out a chemical coprecipitation treatment on the effluent. Thus, according to an advantageous variant of the method of the invention, the chemical coprecipitation treatment may have the dual objective of decontaminating the radioactive effluent, by a chemical coprecipitation treatment resulting in solid radioactive waste, and of synthesizing in situ the composition capable of trapping hydrogen according to the synthesis method described above. In this variant, the solid coprecipitation phase obtained, consisting of a mixture of the radioactive solid waste and of the composition capable of trapping hydrogen, is incorporated directly into the organic encapsulation material according to step a) of the method of the invention.

According to the invention, in the example of encapsulation in a bituminous matrix, the maximum salt content (i.e. the waste+composition of the invention sum) in the encapsulant cannot generally exceed 55%/encapsulant (expressed as mass of salt/mass of encapsulant), i.e. 82%/bitumen (expressed as mass of salt/mass of bitumen).

In general, the solid waste to be encapsulated and the composition according to the present invention are preferably mixed before their encapsulation, so as to obtain a uniform distribution of the composition of the invention and of the waste within the encapsulant and thus to enhance the hydrogen-trapping efficiency.

There are very many applications of the present invention, since it can be used in all situations, for example in industry or in the laboratory, in which gaseous hydrogen (or tritium) is generated, given off or discharged, with the objective for example of limiting the amount thereof that is discharged into the environment, especially for pollution or contamination reasons, or to control the levels thereof in confined environments, especially for safety reasons.

The use of a hydrogen or tritium trap using the compositions of the present invention may be accomplished by various means, which will be chosen depending on the conditions of use and on the environment in which the trap is used. As examples, mention may be made of the following means:

- by bringing hydrogen gas into direct contact with the pulverulent composition in the absence of air;
- by making hydrogen, introduced by bubbling or else generated in situ, come into direct contact with a suspension formed by the composition of the present invention in a non-oxidizing solution;
- by holding the pulverulent composition between two porous plates through which hydrogen or the gas containing hydrogen to be trapped can diffuse;
- by incorporating the composition of the present invention into a material that is chemically inert with respect to the product. This may be an organic or non-organic solid material or one in the viscous state, through which the hydrogen diffuses or within which the hydrogen is generated, for example by radiolysis;
- by surface deposition of the composition capable of trapping hydrogen, as a layer of suitable thickness and in the absence of air, on all or some of the external faces of the chemical system that generates hydrogen gas;
- by incorporating one or more successive layers of the composition of the present invention as a sandwich within the chemical system that generates hydrogen gas.

In the example of the encapsulation of low-level and medium-level radioactive waste in a bitumen matrix, the composition capable of trapping hydrogen of the present invention, incorporated into the bitumen matrix, has several major advantages:

- it possesses the dual chemical property of being a radionuclide decontaminant and a hydrogen trap;
- the routine use of the composition of the present invention within the context of an effluent treatment process avoids having to use other hydrogen-trapping reactants, the chemical stability of which within the reprocessing sludge remains to be demonstrated and the use of which would not be economically profitable since it would entail increasing the amount of sludge and therefore the number of packages;
- being chemically inert with respect to the bitumen matrix, the composition of the present invention retains its hydrogen-trapping capabilities after the operations of hot encapsulation of the sludge in the bitumen;
- being insensitive to irradiation and protected from oxidation within the bitumen matrix, the composition of the present invention durably retains its reactivity with respect to hydrogen; and
- the composition of the present invention is reactive both with respect to hydrogen gas under standard temperature and pressure conditions, and to hydrogen generated, especially by radiolysis, within the bitumen matrix.

Thus, the incorporation of the composition of the present invention into an organic material, for example the bitumen used as radioactive-waste encapsulation matrix, makes it possible to reduce the apparent production of hydrogen by radiolysis, and correspondingly the capability of the material to swell. This application is economically important in industrial reprocessing plants, as the chemical properties of the composition of the present invention allow the possibility of substantially increasing the equivalent activity levels incorporated per waste package, while still guaranteeing good mechanical integrity of the material with respect to gas production.

Other features and advantages of the present invention will become even more clearly apparent on reading the examples that follow, these being given of course by way of illustration but implying no limitation, with reference to the appended figures.

BRIEF DESCRIPTION OF THE FIGURES

FIG. 2 is a graph representing the amount of $H_2$ consumed (quantified by the $H_2/Co$ ratio expressed in mol/mol) as a function of the $NO_3/Co$ ratio (expressed in mol/mol) respectively for:

Figure 1:
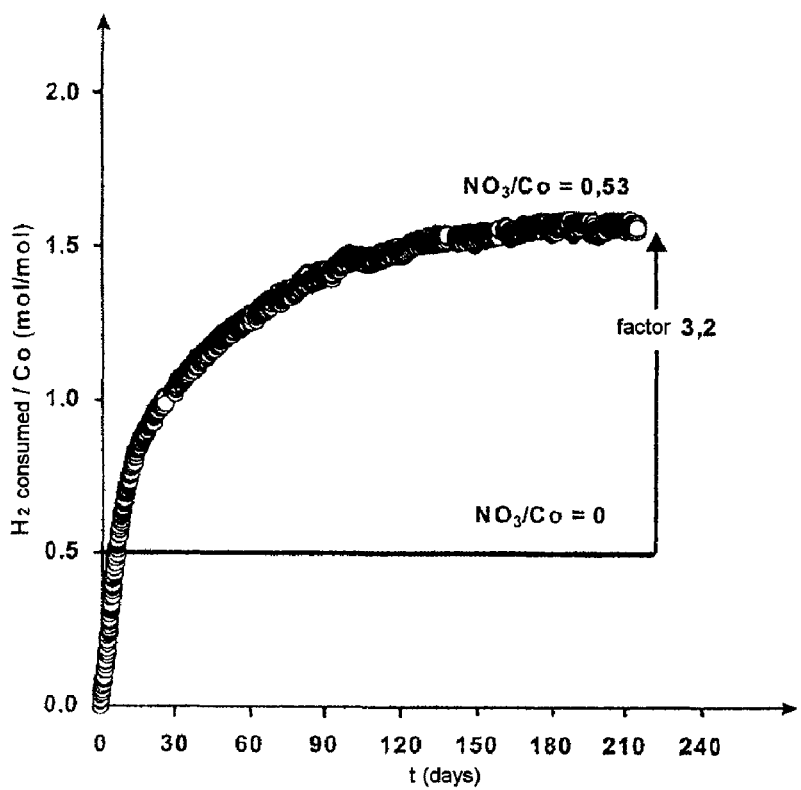
FIG. 1 is a graph representing the total amount of $H_2$ consumed ($H_2/Co$ expressed in mol/mol) by the composition characterized by an $NO_3/Co$ ratio of 0.53 as a function of the time t (expressed in days).

- compositions of the [CoSOH, $NaNO_3$] type alone in the pulverulent state (curve -●-);
- synthetic reprocessing sludges having variable nitrate contents doped with the suspension of CoSOH, the synthesis of which is described in Example 1 (curve -□-);
- a bitumen encapsulant of a synthetic reprocessing sludge in a nitrate medium doped with the suspension of CoSOH, the synthesis of which is described in Example 1 (curve -▨-)

DETAILED SUMMARY OF PARTICULAR EMBODIMENTS

Example 1

In this example, a compound of formula CoS(OH) was synthesized in the laboratory by mixing, with magnetic stirring, two aqueous solutions, namely a cobalt sulphate (97 wt % purity) solution containing 83.5 g/l of $Co^{2+}$ and a sodium sulphide (of formulation $Na_2S.8-10\ H_2O$, 35 wt % $Na_2S$ purity) solution containing 145 g/l of $Na_2S$ in S/Co proportions of 1. The initial pH and $E_H$ values of the reactants were respectively 1.5 and +0.400 V/Ref for the cobalt sulphate solution and 12.8 and −0.760 V/Ref for the sodium sulphide solution. After mixing the reactants, the suspension was left stirring until these pH and $E_H$ parameters stabilized, namely when:

$E_H=-0.133\ V/Ref$ and pH=9.2.

The term "Ref" is understood to mean the fact that the potentials are measured in this scenario relative to an Ag(s)/AgCl(s)/$KCl_{saturated}$ reference electrode.

In this experiment, ten millilitres of the aqueous CoS(OH) suspension obtained (i.e. 7.85 mmol of Co) were withdrawn and poured into a centrifuge tube. After centrifuging and removing the supernatant, the precipitate was washed twice with 10 ml of demineralized water. At the end of the second washing, the precipitate was taken up in 10 ml of demineralized water then 0.351 g of $NaNO_3$ (i.e. 4.13 mmol) were added to the aqueous suspension. After stirring, the system was poured into a crystallizing dish then dried at 70° C. for 48 hours in an oven.

After drying, all of the dry product roughly reduced to a powder (namely around 1.15 g) was placed in a 235 ml sealed cell at ambient temperature (22±3° C.) in a pure hydrogen atmosphere. The consumption of hydrogen by the composition was monitored experimentally by measuring the drop in the hydrogen pressure in the reactor, the atmosphere being regularly replenished in order to compensate for the hydrogen depletion as a function of time. The experiment was monitored until the $H_2$ pressure in the reactor stabilized, indicating that the maximum trapping capacity of the composition had been reached.

From measurements of the variations in pressure (in mbar) as a function of the time, converted by the ideal gas equation into amount of hydrogen trapped (in moles), the change over time of the $H_2$/Co ratio, expressed in moles of $H_2$ trapped per moles of Co, was calculated until the maximum trapping capacity was reached (as is represented in FIG. 1).

From the experimental data, it was possible to evaluate the trapping capacity of the composition of the present invention tested during this test as about 1.58 mol $H_2$/mol of Co, a value significantly higher (by a factor of 3.2) than the trapping capacity of the CoSOH compound alone for which the $NO_3$/Co ratio is zero.

Thus, this experiment demonstrated that:
on the one hand, the compositions of the present invention are capable of spontaneously and quantitatively trapping gaseous hydrogen at ambient temperature, according to a gas-solid type reaction;
on the other hand, a nitrate salt in combination with the CoSOH compound significantly increases the trapping capacity of the CoSOH compound by a factor equivalent to 3.2±0.3 within the context of this test.

Example 2

Several 10 millilitre withdrawals of aqueous CoSOH suspension, the synthesis of which is described in Example 1 and to which variable amounts of $NaNO_3$ were added, without prior washing of the precipitate, were dried after stirring at 70° C. for 48 hours. The dry salts obtained, which were coarsely ground, for which the $NO_3$/Co ratio varied from 0 to 0.53, were subjected to the $H_2$-trapping test described in Example 1 and the maximum trapping capacity was determined for each of them (symbol -●- on the curve from FIG. 2).

Other similar trapping tests were carried out on:
samples of synthetic sludge (coprecipitation-type sludge from radioactive liquid effluents) having variable nitrate contents, doped with the CoSOH suspension, the synthesis of which is described in Example 1. For these tests, the $NO_3$/Co ratio varied between 0 and 3 (symbol -□- on the curve from FIG. 2). The sample preparation process was identical to that described in Example 1);
a bitumen encapsulant sample of a synthetic reprocessing sludge in a nitrate medium doped with the CoSOH suspension, the synthesis of which is described in Example 1 and having an $NO_3$/Co ratio equal to 1.3 (symbol ■ in FIG. 2).

For all these tests, the maximum trapping capacity (expressed as mol $H_2$/mol Co) was determined at the end of the experiment, on stabilization of the $H_2$ pressure in the reactor. The variations in the trapping capacities thus determined as a function of the $NO_3$/Co ratio are represented in FIG. 2.

Figure 2:
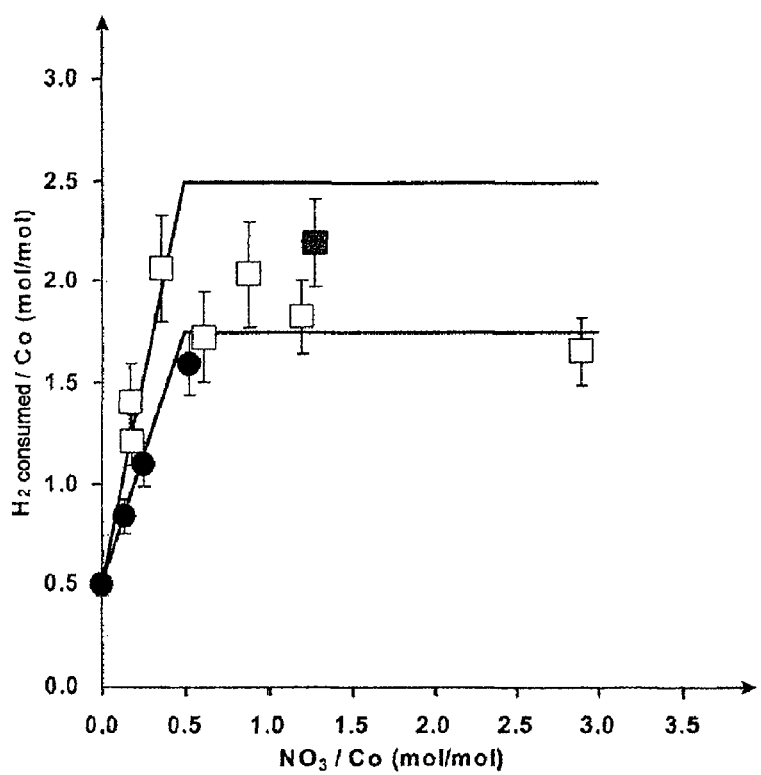

FIG. 2 shows that the maximum $H_2$-trapping capacity of the chemical composition of the present invention varies as a function of the $NO_3$/Co molar ratio according to the following experimental laws:
if the $NO_3$/Co ratio is equal to 0, then the $H_2$/Co ratio is equal to 0.5;
if the $NO_3$/Co ratio is between 0 and 0.5, then the $H_2$/Co ratio lies between the minimum value of 0.5+2.5 ($NO_3$/Co) and the maximum value of 0.5+4($NO_3$/Co);
if the $NO_3$/Co ratio is greater than 0.5, then the $H_2$/Co ratio lies in the range between 1.75 and 2.5. Under these conditions, the trapping capacity of the composition of the present invention is at a maximum and no longer depends on the $NO_3$/Co ratio.

These observations demonstrate that the composition of the present invention in the [CoS(OH), $NaNO_3$] form retains the same trapping performances when it is present within a complex chemical system in which it is chemically stable, such as, for example, a coprecipitation sludge of low-level and medium-level radioactive effluents. Similarly, the trapping performances of the composition remain unchanged when it is incorporated, alone or as a mixture with a sludge, in an encapsulation material, in which it is chemically stable, bitumen for example, and within which hydrogen is generated, by radiolysis for example.

The invention claimed is:

1. A composition capable of trapping hydrogen comprising:
(a) at least one mineral compound of formula MX(OH) wherein
M represents a divalent transition element;
O represents an oxygen atom;
X represents an atom chosen from S, Se, Te, and Po; and
H represents a hydrogen atom; and
(b) at least one nitrate salt of formula $ZNO_3$ wherein Z is a monovalent cation.

2. The composition according to claim 1, in which M is chosen from the group consisting of Co and Ni.

3. The composition according to claim 1, in which M is Co.

4. The composition according to claim 1, in which X is S.

5. The composition according to claim 1, in which Z is chosen from the group consisting of $Li^+$, $Na^+$ or $K^+$.

6. The composition according to claim 1, in which Z is $Na^+$.

7. The composition according to claim 1, in which a $NO_3$/M ratio is greater than 0.5.

8. A method of preparing a composition as defined in claim 1, comprising:
a step of preparing at least one mineral compound of formula MX(OH),
wherein
M represents a divalent transition element;
O represents an oxygen atom;
X represents an atom chosen from S, Se, Te, and Po; and
H represents a hydrogen atom; and
a step of supplying with at least one compound of formula $ZNO_3$,
wherein Z is a monovalent cation.

9. The method of preparing a composition according to claim 8, in which the step of preparing the at least one mineral compound comprises mixing, in aqueous solution, a dissolved salt of X (i.e. $X^{2-}$) and a dissolved salt of M (i.e. $M^{2+}$).

10. The method of preparing a composition according to claim 9, in which the mixing of the dissolved salt of X and of the dissolved salt of M is carried out in air for a sufficient time to obtain pH stabilization.

11. The method of preparing a composition according to claim 9, in which the dissolved salt of X is chosen from among $Na_2X$, $(NH_4)_2X$, $Li_2X$, and $K_2X$, or a mixture of these compounds.

12. The method of preparing a composition according to claim 9, in which the dissolved salt of M is chosen from among $MSO_4$, $M(ClO_4)_2$ and $MCl_2$.

13. The method of preparing a composition according to claim 8, in which M is Co or Ni.

14. The method of preparing a composition according to claim 8, in which X is S.

15. The method of preparing a composition according to claim 8, in which Z is $Na^+$.

16. The method of preparing a composition according to claim 8, wherein said step of supplying with at least one compound of formula $ZNO_3$ is performed before said step of preparing at least one mineral compound of formula MX(OH).

17. The method of preparing a composition according to claim 8, wherein said step of supplying with at least one compound of formula $ZNO_3$ is performed substantially simultaneously with said step of preparing at least one mineral compound of formula MX(OH).

18. The method of preparing a composition according to claim 8, wherein said step of supplying with at least one compound of formula $ZNO_3$ is performed after said step of preparing at least one mineral compound of formula MX(OH).

19. A method of encapsulating a solid waste, said method successively comprising the following steps:
   encapsulation using an organic encapsulation material, liquefied beforehand by heating the solid waste to be encapsulated, and a composition capable of trapping hydrogen; and
   cooling and solidification of the encapsulant obtained in the preceding step,
   wherein said composition capable of trapping hydrogen comprises
   (a) at least one mineral compound of formula MX(OH) wherein
      M represents a divalent transition element;
      O represents an oxygen atom;
      X represents an atom chosen from S, Se, Te, and Po; and
      H represents a hydrogen atom; and
   (b) at least one nitrate salt of formula $ZNO_3$
   wherein Z is a monovalent cation.

20. The encapsulation method according to claim 19, in which the organic material is a bitumen.

21. The encapsulation method according to claim 19, in which the solid waste is radioactive.

22. An organic material for encapsulating radioactive waste comprising:
   an organic encapsulation material; and
   at least one composition capable of trapping the hydrogen comprising
   (a) at least one mineral compound of formula MX(OH) wherein
      M represents a divalent transition element;
      O represents an oxygen atom;
      X represents an atom chosen from S, Se, Te, and Po; and
      H represents a hydrogen atom; and
   (b) at least one nitrate salt of formula $ZNO_3$
   wherein Z is a monovalent cation.

23. The organic encapsulation material according to claim 22, in which the organic encapsulation material is a bitumen.

24. A method of absorbing hydrogen, comprising:
   absorbing hydrogen using a hydrogen trapping composition,
   wherein the hydrogen trapping composition comprises
   (a) at least one mineral compound of formula MX(OH) wherein
      M represents a divalent transition element;
      O represents an oxygen atom;
      X represents an atom chosen from S, Se, Te, and Po; and
      H represents a hydrogen atom; and
   (b) at least one nitrate salt of formula $ZNO_3$
   wherein Z is a monovalent cation.

\* \* \* \* \*